United States Patent
Aoyama et al.

(10) Patent No.: US 8,447,586 B2
(45) Date of Patent: May 21, 2013

(54) APPARATUS AND METHOD FOR SUPPORTING VERIFICATION OF SOFTWARE INTERNATIONALIZATION

(75) Inventors: Nozomu Aoyama, Yokohama (JP); Kei Sugano, Kawasaki (JP); Tadayuki Yoshida, Yokohama (JP); Natsuki Zettsu, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 12/703,185

(22) Filed: Feb. 9, 2010

(65) Prior Publication Data

US 2010/0211377 A1    Aug. 19, 2010

(30) Foreign Application Priority Data

Feb. 13, 2009 (JP) .................................. 2009-31387

(51) Int. Cl.
*G06F 17/20* (2006.01)
*G10L 11/00* (2006.01)
*G10L 21/00* (2006.01)

(52) U.S. Cl.
USPC ............................................ 704/8; 704/270

(58) Field of Classification Search
USPC ..................................................... 704/8, 270
See application file for complete search history.

(56) References Cited

U.S. PATENT DOCUMENTS

| | | | | |
|---|---|---|---|---|
| 4,771,401 A | * | 9/1988 | Kaufman et al. | 715/206 |
| 4,777,617 A | * | 10/1988 | Frisch et al. | 704/8 |
| 5,243,519 A | * | 9/1993 | Andrews et al. | 704/8 |
| 5,418,718 A | * | 5/1995 | Lim et al. | 715/234 |
| 6,442,516 B1 | * | 8/2002 | Lee et al. | 704/8 |
| 7,389,223 B2 | * | 6/2008 | Atkin et al. | 704/8 |
| 7,617,092 B2 | * | 11/2009 | McHugh et al. | 704/9 |
| 2004/0102959 A1 | * | 5/2004 | Estrin | 704/8 |
| 2008/0195377 A1 | * | 8/2008 | Kato et al. | 704/8 |
| 2009/0030673 A1 | * | 1/2009 | Chakra et al. | 704/8 |
| 2009/0030674 A1 | * | 1/2009 | Chakra et al. | 704/8 |

FOREIGN PATENT DOCUMENTS

| | | |
|---|---|---|
| JP | 2001188693 A | 7/2001 |
| JP | 2006190006 | 7/2006 |
| JP | 2006318202 | 11/2006 |
| JP | 2008065794 | 3/2008 |
| JP | 2008276334 | 11/2008 |
| JP | 2009026100 | 2/2009 |

* cited by examiner

*Primary Examiner* — Eric Yen
(74) *Attorney, Agent, or Firm* — North Shore Patents, P.C.; Michele Liu Baillie

(57) ABSTRACT

In a verification support apparatus, a content analysis section analyzes a content to divide the content into paragraphs, extract region/culture-specific data, and store the analysis results in an analysis result storage section. A first verification section verifies, based on the analysis results, the consistency between the content and locale of a paragraph and the consistency between the paragraph and locale of the region/culture-specific data. A second verification section verifies, based on the analysis results, the correspondence between a paragraph of language A and a paragraph of language B and the consistency between the region/culture-specific data of language A and the region/culture-specific data of language B. A content update section updates the content so that the results of verification by the first verification section or the second verification section can be displayed in a way a person in charge of verification can easily understand.

8 Claims, 15 Drawing Sheets

ARMONK, NY - 18 Jun 2008: IBM's (NYSE: IBM) history-making hybrid supercomputer, built for the National Nuclear Security Administration's (NNSA) Los Alamos National Lab, burned its way into the TOP500 Supercomputer record book today as the most powerful system in the world – by a wide margin. Its sustained performance of 1.02 petaflops (1.02 quadrillion calculations per second) puts the system in a class of its own – more than three times faster than the nearest non-IBM system. — PARAGRAPH #1

The official results were reported today during the International Supercomputing Conference in Dresden, Germany, where the bi-annual listing of the World's TOP500 Supercomputer Sites was released. http://www.top500.org/ — PARAGRAPH #2

Built by IBM for the NNSA and housed at its Los Alamos National Laboratory, the petaflop-smashing system gets its world-leading power from 12,240 IBM PowerXCell 8i Cell Broadband Engine™ processors – derived from chips that power today's most popular videogame consoles. 6,562 AMD Opteron Dual-Core processors perform basic compute functions, freeing the IBM® PowerXCell 8i chips for the math-intensive calculations that are their specialty. — PARAGRAPH #3

This "hybrid" architecture, which optimizes the strength of multiple types of processors, is an IBM hallmark. The design is analogous to that of a hybrid car with similar benefits. For example, if the NNSA supercomputer were built with standard x86 chips alone, the system would have been significantly larger and would have required much more power. — PARAGRAPH #4

While the NNSA supercomputer will be used for ensuring the reliability and safety of the nation's nuclear weapons stockpile, it also sets the pace for future research in a variety of scientific and commercial fields including biotech, alternative energy, climate change and physics. IBM expects its hybrid design to lead the way to a commercial supercomputer platform that will support new scientific research and engineering workloads unthinkable just a decade ago. — PARAGRAPH #5

FIG. 2

PARAGRAPH #1

[米国ニューヨーク州アーモンク発]

IBM本社:米国ニューヨーク州アーモンク、会長:サミュエル・J・パルミサーノ、NYSE:IBMにより設計された、米国国家核安全保障局(NNSA)ロス・アラモス国立研究所向けの歴史的なハイブリッド・スーパーコンピューターで、「TOP500 Supercomputer Sites」の記録を塗り替えました。他との圧倒的な差で、今日の世界で最も強力なシステムとし、IBM製以外でこれに次ぐシステムの3倍以上の速度を実現しています。1.026ペタフロップ(毎秒1.026兆回の演算)の持続性能を有し、

PARAGRAPH #2

18日(現地時間)、公式結果が、ドイツのドレスデンで開催されているスーパーコンピューター国際会議において、「TOP500 Supercomputer Sites」の上半期のリストとして発表されました。 http://www.top500.org

PARAGRAPH #3

IBMによりNNSAのために設計され、ロス・アラモス国立研究所に設置された世界最強のペタフロップ・システムの先進的能力は、現在最も人気のあるビデオゲーム機器にも使用されているチップであるIBM PowerXCell 8i Cell Broadband Engine™プロセッサー12,240個により生み出されています。6,562個のAMD Opteron Dual-Coreプロセッサーによりコンピューターの基本的な機能が果たされるため、IBM PowerXCell 8iチップは専門分野である膨大な計算処理に使用できます。

PARAGRAPH #4

NNSAのスーパーコンピューターは、国家の核兵器貯蔵庫の安全と信頼性を守るために使用されるとともに、バイオテクノロジー、代替エネルギー、気候変動、物理学などをも含む様々な科学的、商業的分野における将来的研究にも使用されます。IBMはそのハイブリッド設計により、10年前には想像もつかなかったような新しい科学研究やエンジニアリングの負荷をサポートできる、商用スーパーコンピューターのプラットフォームを目指しています。

ARMONK, NY - 18 Jun 2008 IBM's (NYSE: IBM) history-making hybrid supercomputer, built for the National Nuclear Security Administration's (NNSA) Los Alamos National Lab, burned its way into the TOP 500 Supercomputer record book today as the most powerful system in the world - by a wide margin. Its sustained performance of 1.02 petaflops (1.02 quadrillion calculations per second) puts the system in a class of its own - more than three times faster than the nearest non-IBM system.

(b)

BLOCK ID: 1
BLOCK LOCALE ESTIMATE LIST: en=0.9;de=0.8;···

| No. | SENTENCE ID | START POSITION | END POSITION | CATEGORY ID (DATA TYPE) | LOCALE ESTIMATE LIST |
|---|---|---|---|---|---|
| 1 | 1 | 30089 | 30099 | 2(DATE) | en-US |
| 2 | 1 | 30107 | 30109 | 1(PROPER NOUN) | * |
| 3 | 1 | 30131 | 30133 | 3(NUMERIC) | Western |
| 4 | 2 | 30196 | 30199 | 3(NUMERIC) | Western |
| 5 | 2 | 30211 | 30225 | 3(NUMERIC) | en |

IBM本社:米国ニューヨーク州アーモンク、会長:サミュエル・J・パルミサーノ、NYSE:IBM)により設計された、米国国家核安全保障局(NNSA)ロス・アラモス国立研究所向けの歴史的なハイブリッド・スーパーコンピューターが、他との圧倒的な差で今日の世界で最も強力なシステムとして、「TOP500 Supercomputer Sites」の記録を塗り替えました。1.02ペタフロップ(毎秒1.02兆)回の演算)の持続性能を有し、IBM製以外でこれに次ぐシステムの3倍以上もの速度を実現しています。

(b)

BLOCK ID: 1
BLOCK LOCALE ESTIMATE LIST: ja=0.9; …

| No. | SENTENCE ID | START POSITION | END POSITION | CATEGORY ID (DATA TYPE) | LOCALE ESTIMATE LIST |
|---|---|---|---|---|---|
| 1 | 1 | 30017 | 30026 | 2(DATE) | zh-CN |
| 2 | 1 | 30081 | 30083 | 1(PROPER NOUN) | * |
| 3 | 1 | 30181 | 30183 | 3(NUMERIC) | Western |
| 4 | 2 | 30217 | 30220 | 3(NUMERIC) | Western |
| 5 | 2 | 30230 | 30235 | 3(NUMERIC) | ja |

FIG. 6

| CATEGORY | | NUMERIC | | | | DATE | | | |
|---|---|---|---|---|---|---|---|---|---|
| | | CHARACTER STRING LOCALE | | | | CHARACTER STRING LOCALE | | | |
| | | en | ja | zh_CN | Western | en | ja | zh_CN | Western |
| BLOCK LOCALE | en | H | D | D | M | H | D | D | H |
| | de | H | D | D | M | H | D | D | H |
| | ja | H | H | M | H | L | H | M | L |
| | zh_Hans | H | M | H | L | L | M | H | L |
| | ar | L | D | D | L | L | D | D | L |

BLOCK ID: 1
BLOCK LOCALE ESTIMATE LIST: ja=0.9;...

| No. | SENTENCE ID | START POSITION | END POSITION | CATEGORY ID (DATA TYPE) | LOCALE ESTIMATE LIST |
|---|---|---|---|---|---|
| 1 | 1 | 10011 | 10011 | 5(DATE SUPPLEMENTAL INFORMATION) | CJK |
| 2 | 1 | 10013 | 10022 | 2(DATE) | Western |
| 3 | 1 | 10024 | 10028 | 4(TIME) | * |
| 4 | 1 | 10030 | 10031 | 6(TIME SUPPLEMENTAL INFORMATION) | CJK |

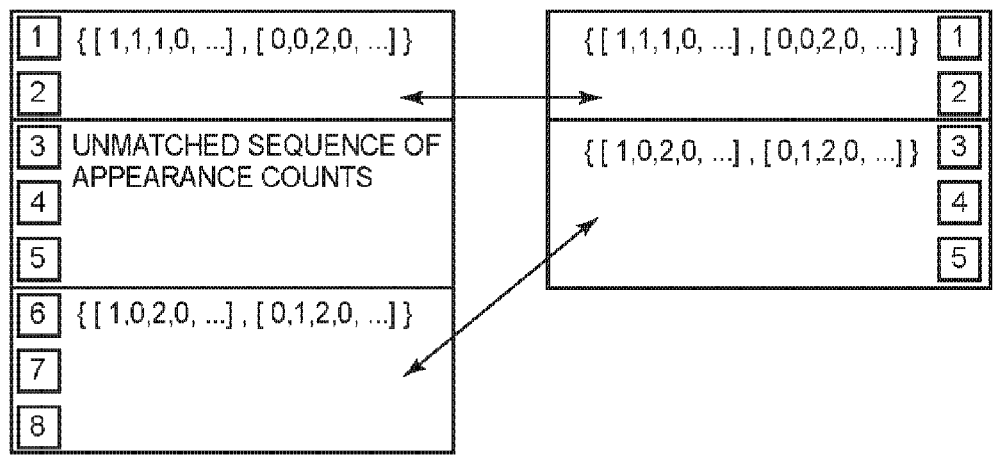
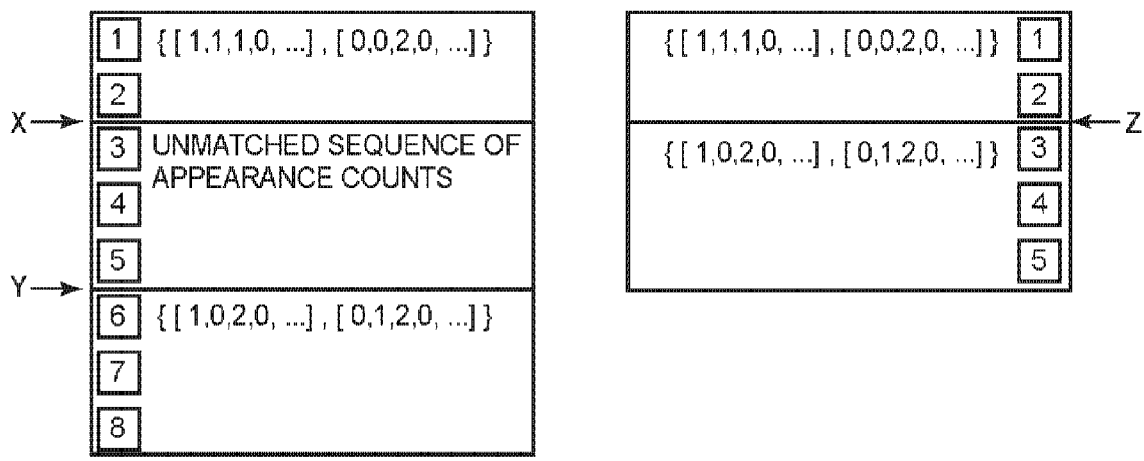
FIG. 11

[米国ニューヨーク州アーモンク 2008年6月18号 (現地時間)発]

IBM本社:米国ニューヨーク州アーモンク、NYSE:IBMにより設計された、米国国家核安全保障局 (NNSA) ロス・アラモス国立研究所向けのハイブリッド・スーパーコンピューターが、他との圧倒的な差で、今日の世界で最も強力なシステムとして「TOP500 Supercomputer Sites」の記録を塗り替えました。1.02ペタフロップ(毎秒1.02の兆回の演算)の持続性能を有し、IBM製でこれに次ぐシステムの3倍以上のもの速度を実現しています。

Number Format Warning!
1.02 quadrillion (en)

18日 (現地) のドレスデンで開催されているスーパーコンピューター国際会議において、「TOP500 Supercomputer Sites」リストの最新版として発表されました。

FIG. 13

APPARATUS AND METHOD FOR SUPPORTING VERIFICATION OF SOFTWARE INTERNATIONALIZATION

CROSS-REFERENCE TO RELATED APPLICATIONS

The present invention claims priority to Japanese Patent Application No. 2009-31387, filed on Feb. 13, 2009.

BACKGROUND

The present invention relates to an apparatus and method for supporting verification of software internationalization.

Internationalization of software has been developing in these years. Internationalization of software means that software usable only in a specific monolingual environment is so adjusted that it can be used in other language environments. For example, it means that software capable of using only English is so improved that it can use languages other than English (for example, Japanese, Chinese, Korean, German, Russian, etc.). In the internationalization of software, the following is done to adapt to other language environments:

Translating messages and menus on a user interface;
Changing data description formats such as time and date, numeric, currency, etc. (i.e., the year-month-day order, symbols used as the decimal point and thousands separator);
Changing comparison and sorting algorithms for character strings; and
Changing fonts and character sets used for display purposes The internationalization of software requires testing whether there is a problem in the behavior of software in a new language environment. Such testing is called "globalization testing." Globalization testing is to verify whether a system to be tested correctly handles the above region- or culture-dependent information.

It is desired that this globalization testing be done by a native of the target region, culture, and language, or a person well-versed therein. However, the actual situation today is that this test is often done centrally in some regions. For example, test on languages across Asia is often done in China. Further, in many cases, software is developed based on a primary language (normally English), so that verification in other languages often involves checking in comparison with the results in the primary language.

Under such circumstances, difficulty in doing the test increases, causing problems of test imperfection due to overlooked data errors. Specifically, the following problems can occur:

(1) A person in charge of testing focuses only on seemingly apparent items, such as whether the display is provided correctly and whether the characters are not garbled, without knowing points to be noted in testing whether region- or culture-dependent data is displayed correctly.

(2) When viewing a correct display in a language familiar with the person, the person overlooks the possibility that the display may not be appropriate in a test target region.

(3) When characters are displayed in a language-dependent format such as the time and date or currency, the person cannot determine whether the characters are placed in a correct format.

(4) The person is not aware that two or more languages co-exist in information displayed using the same type of alphabet such as western languages.

(5) The person cannot find a missing portion in another language even when it is displayed in the primary language.

Conventionally, there have been some proposals for internationalization of software. In Japanese Patent Application Publication No. 2001-188693, a master scorecard, in which data to indicate a main category of internationalization topics to be investigated by the user is listed, is generated to calculate a prescribed statistic to indicate preparations for internationalization of software products regarding the main category of topics listed in this master scorecard. In Japanese Patent Application Publication No. 2008-065794, multiple fonts obtained by associating letter forms, using different association rules, with a group of multiple character codes to be tested and a group of other multiple character codes are prepared for each font, and output information from internationalization software for performing processing with reference to a pseudo-translated test resource file is displayed using one of the multiple fonts so that the character codes to be tested and the other character codes will be identifiable in displaying the output information using each font.

Thus, there are conventional techniques for internationalization of software. However, the technique of Japanese Patent Application Publication No. 2001-188693 is to assess and improve internationalization readiness of software, and not to support verification work as the most important part of the internationalization of software. Further, the technique of Japanese Patent Application Publication No. 2008-065794 is to address attention to the above-mentioned problem (1) in testing internationalization software, and not to cover the above-mentioned problems (2) to (5).

It is an object of the present invention to improve the efficiency and reliability of verification of a character string described in a language-dependent format.

BRIEF SUMMARY

According to an embodiment of the present invention, a method of supporting verification of software internationalization comprises: acquiring first text data output by an operating software in a first language environment; extracting, from the first text data, multiple character strings of a predetermined kind described in a language-dependent format; acquiring second text data output by the operating software in a second language environment; extracting, from the second text data, multiple character strings of the predetermined kind; associating each of the multiple character strings extracted from the first text data with each of the multiple character strings extracted from the second text data based on a difference between each character string extracted from the first text data and each character string extracted from the second text data; and comparing a first normalized character string, obtained by normalizing, in a specific description format, a first character string of the multiple character strings extracted from the first text data, with a second normalized character string, obtained by normalizing, in the specific description format, a second character string selected as being associated with the first character string from among the multiple character strings extracted from the second text data to determine whether a content represented by the first character string is consistent with a content represented by the second character string.

According to another embodiment of the present invention, a method for supporting verification of software internationalization comprises: acquiring multiple text blocks output by an operating software; extracting from each of the multiple text blocks a character string of a predetermined kind described in a language-dependent format; and determining whether to associate a first text block of the multiple text blocks output by the operating software in a first language environment with a second text block of the multiple text blocks output by the operating software in a second language environment, based on the character string extracted from the first text block and the character string extracted from the second text block.

According to another embodiment of the present invention, a method for supporting verification of software internationalization comprises: extracting multiple text blocks from text data output by an operating software; extracting from each of the multiple text blocks multiple character strings of a predetermined kind described in a language-dependent format; determining whether to associate a first text block of the multiple text blocks extracted from first text data output by the operating software in a first language environment with a second text block of the multiple text blocks extracted from second text data output by the operating software in a second language environment, based on the multiple character strings from the first text block and the multiple character strings extracted from the second text block; when the first text block and the second text block are determined to be associated, determining, using a difference between a first character string and a second character string, whether to associate the first character string of the multiple character strings extracted from the first text block with the second character string of the multiple character strings extracted from the second text block; when the first character string and the second character string are determined to be associated, comparing a first normalized character string obtained by normalizing the first character string in a specific description format with a second normalized character string obtained by normalizing the second character string in the specific description format to determine whether a content represented by the first character string is consistent with a content represented by the second character string; and outputting the result of the determining whether the content represented by the first character string is consistent with the content represented by the second character string in association with at least either of the first character string in the first text data and the second character string in the second text data.

Computer program products corresponding to the above-summarized methods are also described and claimed herein.

BRIEF DESCRIPTION OF THE SEVERAL VIEWS OF THE DRAWINGS

FIG. 2 is an illustration showing an example of an English content stored in a content storage section of the embodiment of the present invention.

FIG. 3 is an illustration showing an example of a Japanese content stored in the content storage section of the embodiment of the present invention.

FIG. 5 is an illustration showing an example of analysis results of the English content by the content analysis section of the embodiment of the present invention.

FIG. 6 is an illustration showing an example of analysis results of the Japanese content by the content analysis section of the embodiment of the present invention.

FIG. 8 is a table showing an example of a tolerance table referred to by the first verification section of the embodiment of the present invention.

FIG. 10-1 is the first half of a flowchart showing an example operation of a second verification section in the embodiment of the present invention.

FIG. 10-2 is the second half of the flowchart showing the example operation of the second verification section in the embodiment of the present invention.

FIG. 11 is an illustration for explaining how the second verification section of the embodiment of the present invention determines missing blocks and notifies information on the missing blocks.

FIG. 13 is an illustration showing a display example of verification results in the embodiment of the present invention.

DETAILED DESCRIPTION

Figure 1:
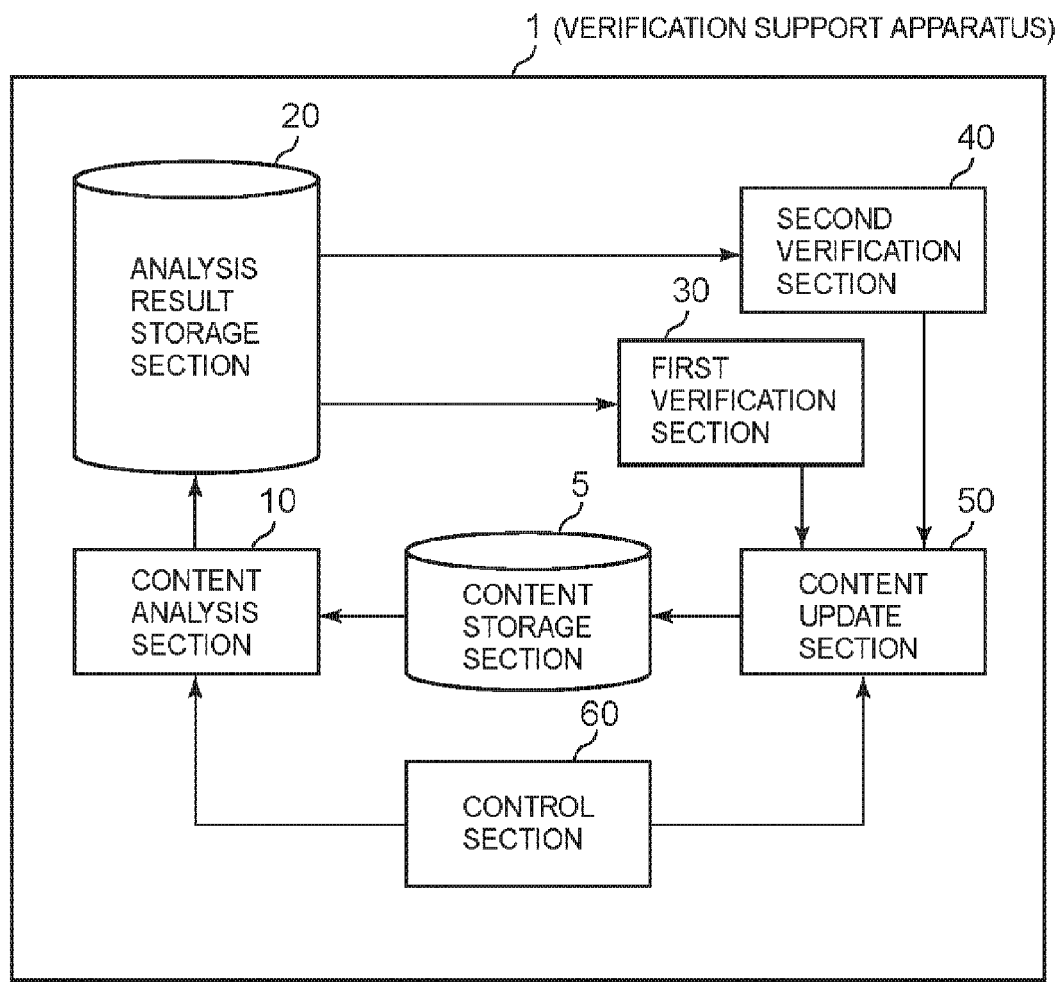
FIG. 1 is a block diagram showing an example of a functional configuration of a verification support apparatus according to an embodiment of the present invention.

An embodiment of the present invention will now be described in detail with reference to the accompanying drawings. First, a functional configuration of a verification support apparatus 1 for supporting verification of software internationalization according to the embodiment will be described. FIG. 1 is a block diagram showing an example of the functional configuration of the verification support apparatus 1. As shown, this verification support apparatus 1 includes a content storage section 5, a content analysis section 10, an analysis result storage section 20, a first verification section 30, a second verification section 40, a content update section 50, and control section 60.

The content storage section 5 stores contents to be displayed on a screen of the verification support apparatus 1. The content analysis section 10 analyzes a content stored in the content storage section 5 to extract elements to be verified. Specifically, natural language processing is applied to the content to acquire data (hereinafter called "region/culture-specific data") having a description format dependent on the region or culture, and information (hereinafter called "configuration information") on the content structure. Here, the region/culture-specific data include date, time, numeric, currency, etc. The configuration information includes paragraph information, language information, words other than the region/culture-specific data, etc. Note that these pieces of information are associated with one another wherever possible. For example, for each paragraph, a language(s) used in the paragraph, the number of region/culture-specific data included in the paragraph, the order in which the region/culture-specific data appear, the number of sentences included in the paragraph, etc. are managed. In the embodiment, the content analysis section 10 is provided as an example of a configuration including a text data acquiring section for acquiring text data, a text block acquiring section for acquiring multiple text blocks, and a text block extracting section for extracting multiple text blocks from the text data. Further, a data type of the region/culture-specific data (date type, time type, numeric type, currency type, etc.) is used as an example of a predetermined kind as a kind that is described in a language-dependent format, and the content analysis section 10 is provided as an example of a character string extracting section for extracting character strings of the predetermined kind from text data or each of the multiple text blocks.

The analysis result storage section 20 holds the results of the analysis by the content analysis section 10. Specifically, the results of the analysis by the content analysis section 10 are held in a database or the like. At this time, the results of analysis by the content analysis section 10 are always stored in the analysis result storage section 20. The analysis results are made to be referable in response to a request from another functional section. In the embodiment, they are referred to in response to requests from the first verification section 30 and the second verification section 40 to be described later. Although only one analysis result storage section 20 is shown in FIG. 1, two or more analysis result storage sections 20 may be so provided such that one analysis result storage section 20 stores analysis results related to one language, or such that analysis results related to a specific language are divided and stored in two or more analysis result storage sections 20. In this case, when a request with a language specified by its URL is made from the second verification section 40 to be described later, a list of URLs in other languages analogized from the URL can also be returned, for example.

The first verification section 30 verifies elements extracted by the content analysis section 10. Here, for example, the following verification is done. First, it is verified whether the language of the entire content matches the language of each paragraph. Secondly, it is verified which language rules the format of the region/culture-specific data follows. For example, since "2008 年 6 月 " represents year and month in Japanese date format, this date format is verified to prove that it follows the Japanese rules. Thirdly, it is verified whether the format of region/culture-specific data fits the language of the content including the data. This verification can prove, for example, that the English date format appears in Japanese text, etc. In the embodiment, the first verification section 30 is provided as an example of a language consistency determining section for determining whether the language of text data is consistent with the language of a character string.

The second verification section 40 is a device for comparing analysis results related to multiple languages held in the analysis result storage section 20 to do further advanced verification. For example, analysis results related to a primary language (English in many cases) are compared with analysis results related to a sublanguage (Japanese, etc.) to do verification. Specifically, the following verification is done in addition to the verification by the first verification section 30. First, verification related to the content structure is done based on configuration information. In other words, it is verified whether the numbers of paragraphs are the same and whether corresponding paragraphs have the same number of region/culture-specific data pieces to find a missing portion (s) in the paragraph. Secondly, corresponding dates or the like are normalized and compared as to whether they are the same or whether the difference therebetween falls within an acceptable range. For example, when "2008 年 6 月 " and "June 2008" are normalized, since both become "2008-06-00," they are determined to be the same. In the embodiment, it is assumed that analysis results on multiple languages to be verified by the second verification section 40 are all held in the analysis result storage section 20, but only analysis results on a certain language may be held in the analysis result storage section 20. In this case, for example, analysis results on the primary language are held in the analysis result storage section 20, so that the content analysis section 10 analyzes the content of a sublanguage and the second verification section 40 does verification by comparing the analysis results with the analysis results stored in the analysis result storage section 20. In the embodiment, the second verification section 40 is provided as an example of a configuration including a text block association determining section for determining whether to associate a first text block and a second text block, a character string association determining section for determining whether to associate a first character string and a second character string, and a content consistency determining section for determining whether a content represented by the first character string is consistent with a content represented by the second character string.

The content update section 50 updates the content stored in the content storage section 5 in such a manner that the results of verification by the first verification section 30 and the second verification section 40 will be displayed in an easy-to-understand manner on the screen of the verification support apparatus 1. In this case, for example, each result may be highlighted according to the level of importance or category. If only analysis results on a certain language among analysis results on multiple languages to be verified by the second verification section 40 are held in the analysis result storage section 20, information obtained from the content analysis section 10 may be included in the items to be displayed in an easy-to-understand manner on the screen of the verification support apparatus 1. In the embodiment, the content update section 50 is provided as an example of an output section for outputting the results of determination by the content consistency determining section. The control section 60 controls cooperative operation among the content analysis section 10, the first verification section 30, the second verification section 40, and the content update section 50.

Next, the operation of the verification support apparatus 1 according to the embodiment will be described in detail. Here, it is assumed that there are an English content output by operating internationalized software in an English environment and a Japanese content output by operating the same software in a Japanese environment. Suppose further that region/culture-specific data are included in these contents.

Figures 1, 10:
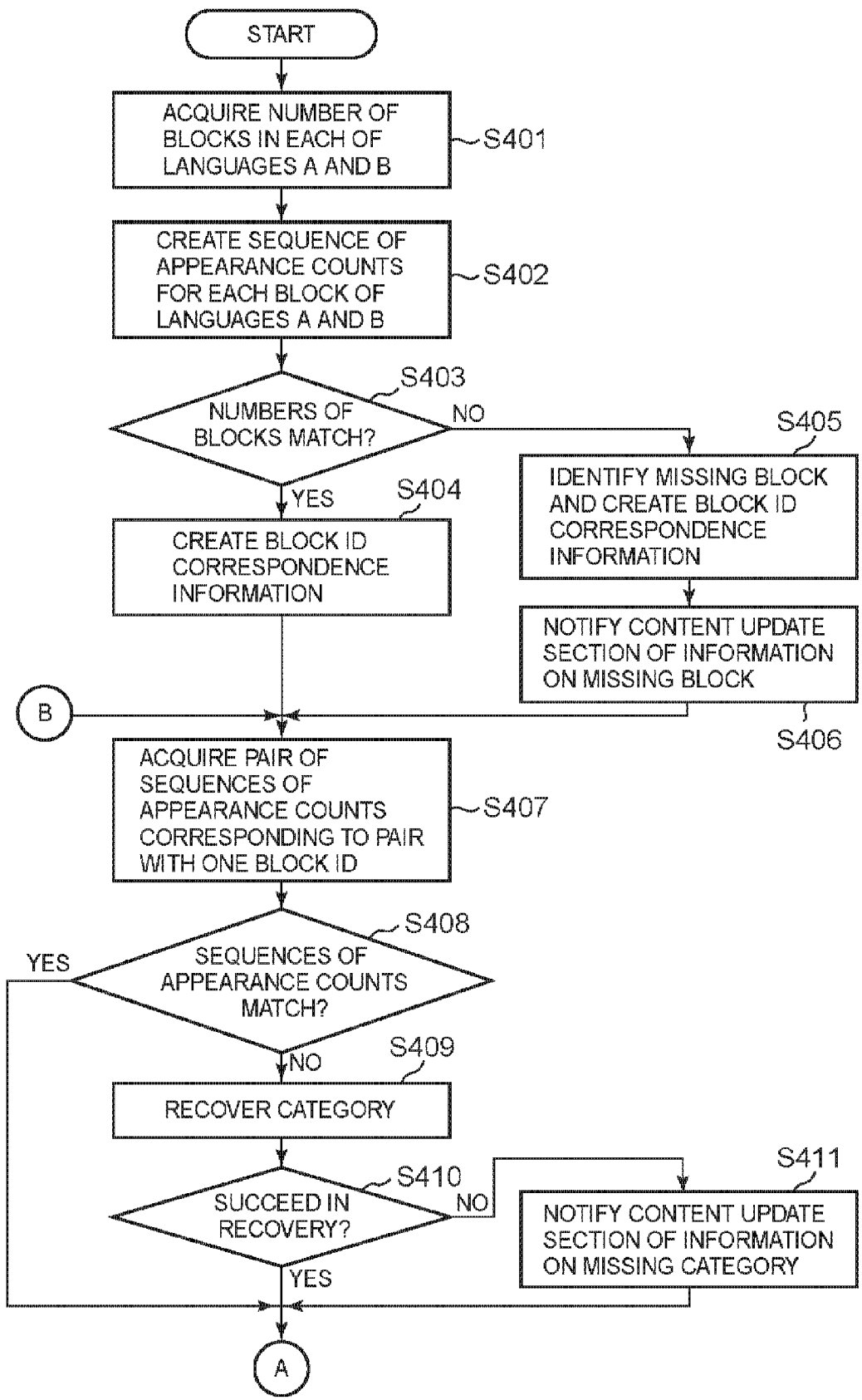
Figures 2, 10:
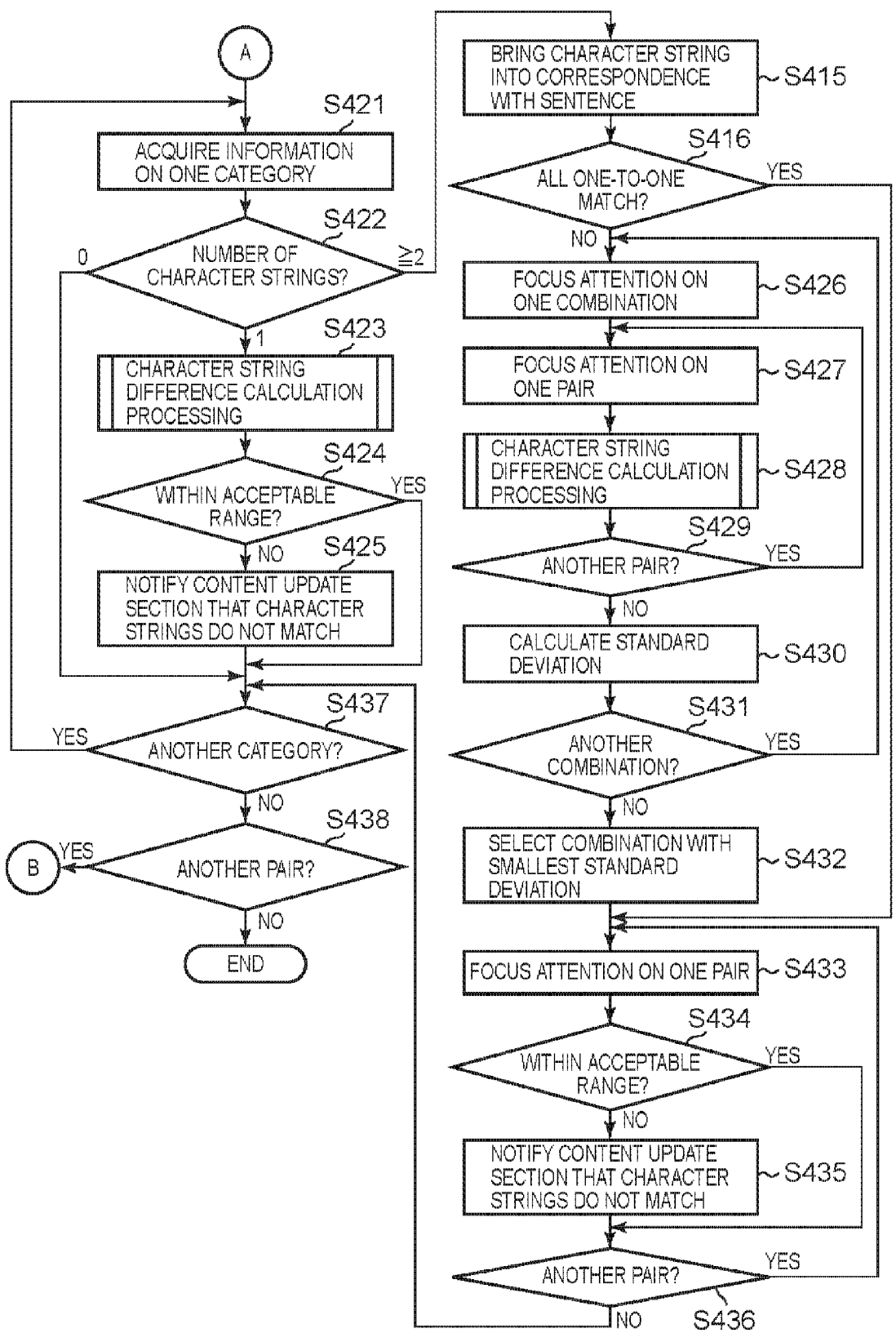

FIG. 2 and FIG. 3 show the contents used in the following description. FIG. 2 shows the English content output in the English environment, and FIG. 3 shows the Japanese content output in the Japanese environment. As will be apparent from the following description, a paragraph corresponding to paragraph #4 in the English content shown in FIG. 2 is not present in the Japanese content shown in FIG. 3, showing an example of a missing paragraph.

Assuming that such contents are stored in the content storage section 5, the operation of each functional section will be described. The operation of the content analysis section 10 will first be described. Here, it is assumed that the content analysis section 10 operates on the following assumption. Firstly, the target content can be acquired as byte data from a computer on a network using a protocol such as HTTP (HyperText Transfer Protocol) or FTP (File Transfer Protocol), or from a local machine. As a typical example, it is assumed that it can be located at URL (http:// . . . or file:// . . . ). Secondly, the content analysis section 10 can acquire the "text expressions" of the target content in some way. For example, even an image or animation content can be a target as long as text included therein can be extracted. Thirdly, text data (hereinafter simply called "text") acquired from the target content can be divided into text blocks (hereinafter simply called "blocks") such as paragraphs shown in FIG. 2 and FIG. 3. In many cases, character strings or tags as markers to indicate division of blocks are defined in the content, depending on the MIME (Multipurpose Internet Mail Extension) type. For example, if the MIME type is "text/html," delimiters </p> and <p> may be used to mark a block therebetween. If the MIME type is "text/plain," a line with the line break only (blank line) may be used as a block delimiter.

Figure 4:
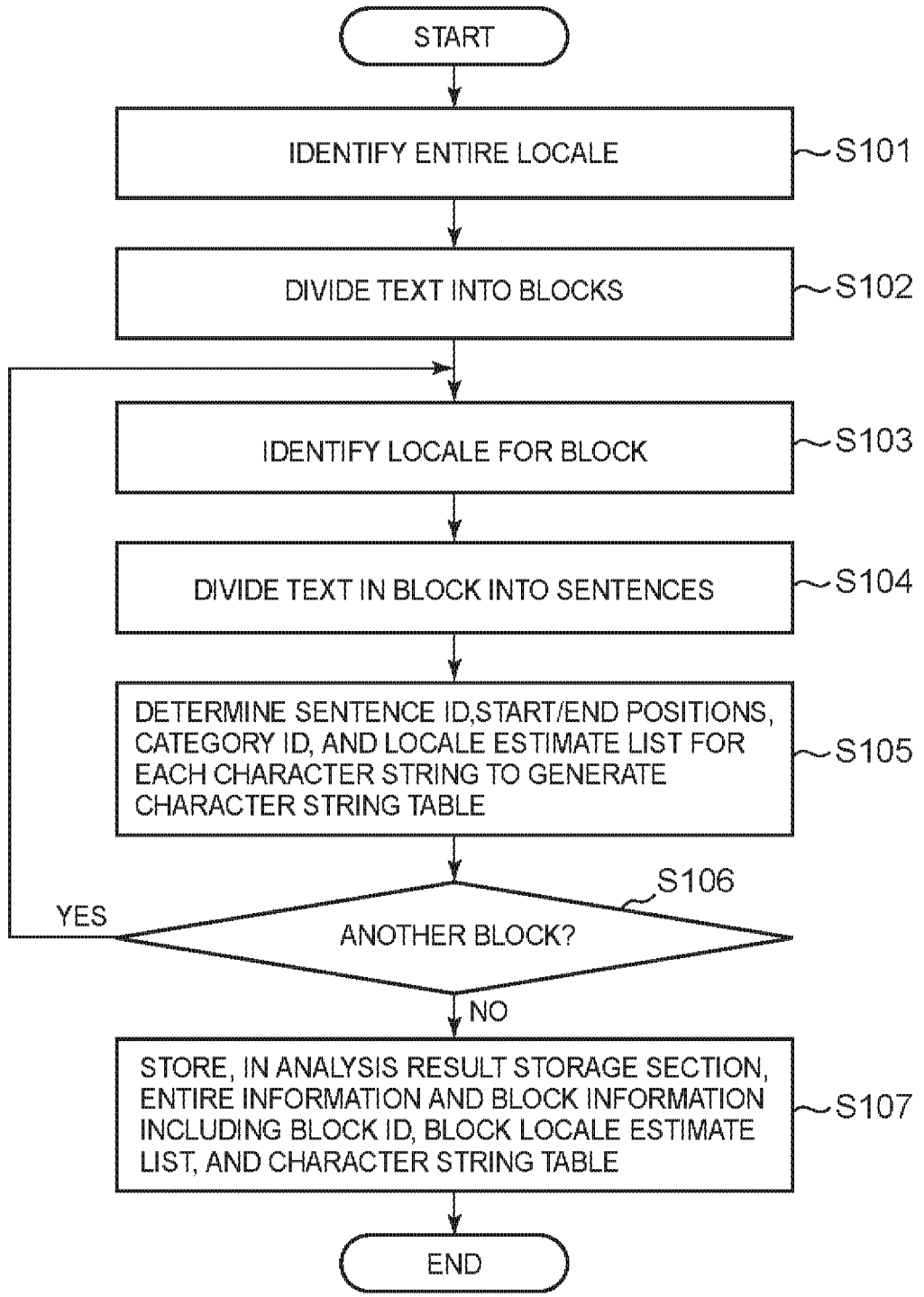
FIG. 4 is a flowchart showing an example operation of a content analysis section in the embodiment of the present invention.

Under these assumptions, when acquiring text to be processed, the content analysis section 10 operates as follow. FIG. 4 is a flowchart showing an example operation of the content analysis section 10. First, the content analysis section 10 scans the entire text to be processed to identify in which language the text is written as a whole (locale), and estimate its confidence coefficient (step 101). Here, the estimation results are held as a list with probable values (hereinafter called "locale estimate list") using the probable values as indexes each indicating the possibility of being written in each language. For example, if the probable value of English is 0.85 and the probable value of German is 0.7, a locale estimate list "en=0.85; de=0.7; . . . " is held. In this specification, identifiers for language tags that conform to BCP (Best Current Practice) 47 are used to represent languages like "en" for English and "de" for German, but it is not necessarily limited thereto.

Next, the content analysis section 10 divides the entire text to be processed into blocks (step 102). Here, the block may be a text string consisting of multiple sentences, as well as a paragraph shown in FIG. 2 and FIG. 3. The division into blocks may be made by delimiting each block between </p> and <p> in the case of an HTML document, for example. In this division into blocks, a block ID capable of uniquely identifying each block in the entire text is assigned to the block.

Then, the content analysis section 10 repeats the following processing for each block. Namely, the content analysis section 10 first estimates locale for the block (step 103). Here, as mentioned above, the estimation results are held as the locale estimate list. For example, if the probable value of English for a block with block ID "1" is 0.9 and the probable value of German for the block is 0.8, a locale estimate list "en=0.9; de=0.8; . . . " is held in association with block ID "1." Next, the content analysis section 10 breaks or divides text in the block into sentences (step 104). In this division into sentences, a sentence ID capable of uniquely identifying each sentence in the block is assigned to the sentence.

Further, the content analysis section 10 determines the sentence ID, start position, end position, category ID, and locale estimate list for each character string (token) that can be different from another in description format due to the locale to generate a character string table in which the determined items are associated with one another (step 105). Here, the sentence ID is a sentence serial number in the block, the start position and end position are the start and end positions of the character string based on the top of the entire text to be processed. The category ID is ID of the category (e.g., a kind such as date, time, numeric, currency, etc.) of the character string, and the locale estimate list is a result of locale estimation of the character string. In this case, the character string included in the character string table and the category ID and the locale estimate list associated with the character string in the character string table are determined as follows: First, correspondences among category ID, cultural format, and locale are prepared. Then, if there is a character string that matches this cultural format in the text, the character string is determined to be the character string included in the character string table, and the category ID and locale corresponding to the cultural formats are determined to be the category ID and locale to be associated with the character string. At this time, if there is a character string that matches cultural format that corresponds to two or more pairs of category ID and locale, the locale estimate list associated with the character string may include two or more locales.

After that, the content analysis section 10 determines whether there is any other unprocessed block (step 106). As a result, if there is an unprocessed block, processing returns to step 103. On the other hand, if there is no unprocessed block, the content analysis section 10 stores, in the analysis result storage section 20, entire information including the entire locale estimated in step 101 and block information including block ID, the locale for the block estimated in step 103, and the character string table generated in step 105, as the text analysis results (step 107). The entire information stored here may include position information on target text. As this position information, a URL such as http://www.foo.com/en-us/info.html is exemplified. The entire text may be included in the entire information.

Here, the block information stored in step 107 will be described with reference to a specific example. FIG. 5 is an illustration for explaining block information on paragraph #1 of the English content shown in FIG. 2. In FIG. 5(a), character strings extracted from paragraph #1 are shown in solid frames on the text of paragraph #1. In FIG. 5(b), an example of block information including these character strings is shown. In other words, it is first shown that the block ID of the block shown at FIG. 5(a) is "1." It is also shown that the locale estimate list of this block is "en=0.9; de=0.8; . . . . "

A character string table is further shown at FIG. 5(b). As mentioned above, this character string table shows correspondences among sentence ID, start position, end position, category ID, and locale estimate list. In FIG. 5, "proper noun" is also shown as a data type. The "proper noun" data type is not a data type that can be different in description format depending on the locale, but such a data type is also included because it is useful to verify a missing portion in the block or the like to be described later. Further, only "proper noun," "date," and "numeric" are illustrated here as data types, but URL, currency, and the like may also be adopted as data types. Further, "*" may be set in the locale estimate list. This mark "*" means locale independence, i.e., that any locale results in the same notation. In addition, an identifier such as "Western" representing a set of specific locales may also be set.

Specifically, the character string table shown manages information indicating that "18 Jun. 2008" is of date type and the locale estimate list is "en-US," "IBM" is a proper noun and the locale estimate list is "*," "500" is of numeric type and the locale estimate list is "Western," "1.02" is of numeric type and the locale estimate list is "Western," and "1.02 quadrillion" is of numeric type and the locale estimate list is "en."

On the other hand, FIG. 6 is an illustration for explaining block information on paragraph #1 of the Japanese content shown in FIG. 3. In FIG. 6(a), character strings extracted from paragraph #1 are shown in solid frames on the text of paragraph #1. In FIG. 6(b), an example of block information including these character strings is shown. In other words, it is first shown that the block ID of the block shown at FIG. 6(a) is "1." It is also shown that the locale estimate list of this block is "ja=0.9; . . . . " Although a character string table is further shown at FIG. 6(b), since the general description of this character string table is already given with reference to FIG. 5, the description will be omitted here.

Specifically, the character string table shown manages information indicating that "2008 年 6 月 18 日 " is of date type and the locale estimate list is "zh-CN," "IBM" is a proper noun and the locale estimate list "*," "500" is of numeric type and the locale estimate list is "Western," "1.02" is of numeric type and the locale estimate list is "Western," "1.020 ※" and is of numeric type and the locale estimate list is "ja."

Figure 7:
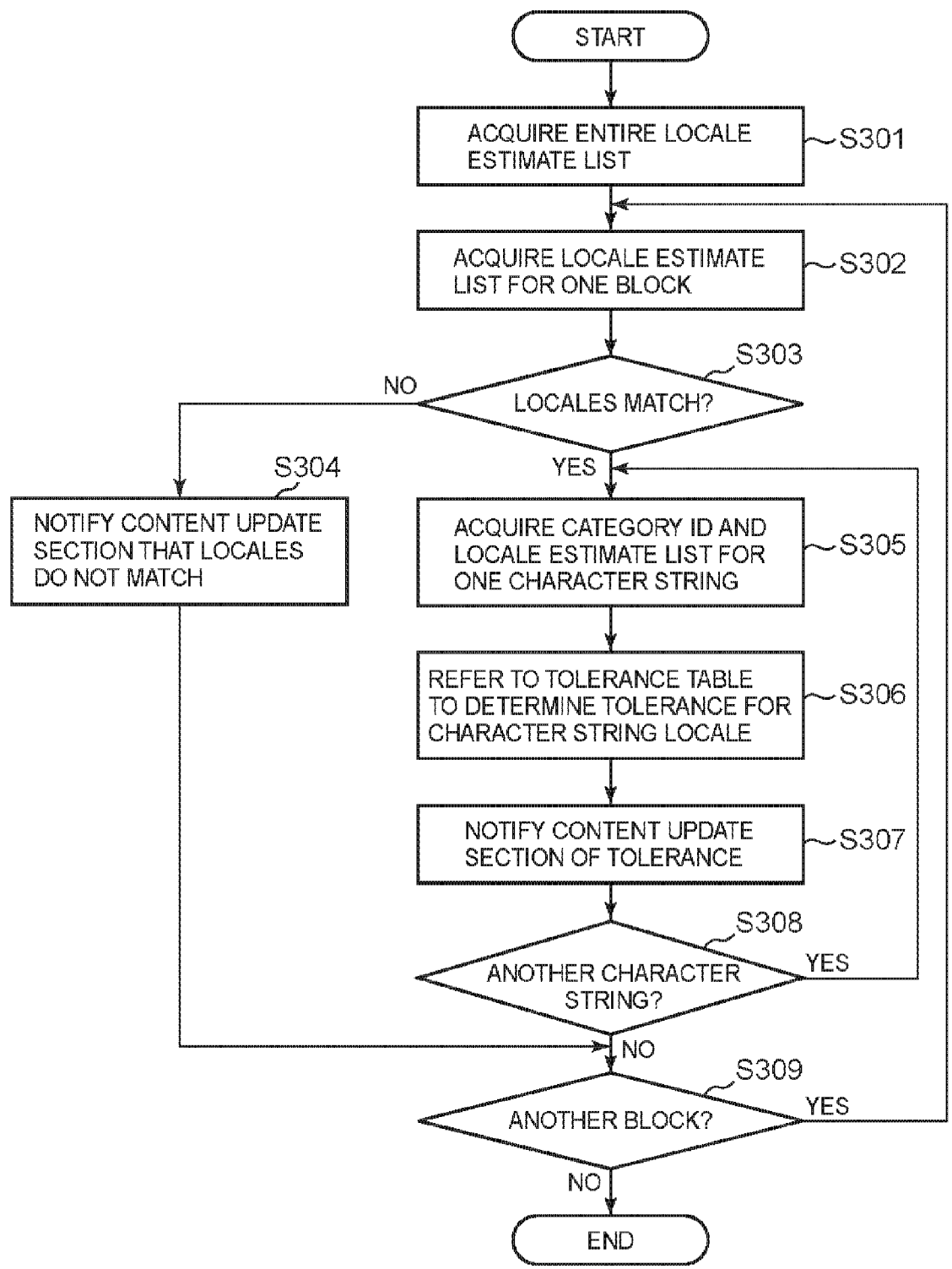
FIG. 7 is a flowchart showing an example operation of a first verification section in the embodiment of the present invention.

Next, the operation of the first verification section 30 will be described. If the locale estimate list of the entire text does not match or include that of each block or each character string, this first verification section 30 can notify this to the person in charge of verification. Specifically, the following operation is performed. FIG. 7 is a flowchart showing an, example operation of the first verification section 30. First, the first verification section 30 acquires the entire locale estimate list from the entire information stored in the analysis result storage section 20 (step 301). Then, the first verification section 30 performs locale matching of each block with the entire text. In other words, a locale estimate list for one block is acquired from the block information stored>in the analysis result storage section 20 (step 302) to determine whether the entire locale matches that for the block (step 303). Here, it is assumed that first language candidates in the locale estimate lists are compared. If the entire locale estimate list is "en=0.85; de=0.7; . . . " and the locale estimate list for the block is "en=0.9; de=0.8; . . . , " only the locales "en" are compared. As a result, if the locales are different, the content update section 50 is notified that the block. ID and information indicates that the locales do not match (step 304).

On the other hand, if the locales match, the first verification section 30 performs locale matching of each character string with the block. In other words, a category ID and its locale estimate list corresponding to one character string is acquired from the character string table stored in the analysis result storage section 20 (step 305). Then, a tolerance table is referenced to determine a tolerance for the character string locale (step 306). The tolerance table is a table in which a tolerance for each pair of block locale and character string locale is set for each category of the character string in a manner to be described in detail later. The first verification section 30 notifies the content update section 50 of the determined tolerance together with the sentence ID, start position, and end position associated with the character string in the character string table (step 307).

After that, the first verification section 30 determines whether there is any other unprocessed character string (step 308). If there is an unprocessed character string, processing returns to step 305. On the other hand, if there is no unprocessed character string, the first verification section 30 determines whether there is any other unprocessed block (step 309). If there is an unprocessed block, processing returns to step 302. On the other hand, if there is no unprocessed block, processing ends.

The following describes the tolerance table referred to in step 306. FIG. 8 is a table showing an example of the tolerance table. As shown, in this tolerance table, locales for blocks are set in the vertical direction, and locales for character strings are set in the horizontal direction on a category basis. Then, a tolerance is set in each cell corresponding to locale for a block and locale for a character string on a category basis to indicate how much the character string locale in the block locale is allowed. Here, the tolerance is represented by four levels, D (Decline), L (Low), M (Medium), and H (High), and these levels correspond to "NG," "Warning," "Caution," and "OK," respectively, in terms of indications of verification results. However, the number of tolerance levels and their definitions are not limited to those mentioned above. Further, as to which kind of tolerance is set in which cell, it is also not limited to those as shown, and can be determined without any inhibition according to the test policy and the characteristics of a target application.

Next, verification processing by the first verification section 30 shown in FIG. 7 will be specifically described. Suppose here that the verification processing of FIG. 7 is performed on the block information shown in FIG. 6. In this case, the entire locale is estimated as "ja" in step 301, the locale for the block with block ID "1" is estimated as "ja" in step 302, and the entire locale is determined in step 303 to match the locale for the block. As a result, the content update section 50 updates the content so that one can understand that the verification result is "OK."

Further, in step 305, category "date" and locale "zh_CN" for "2008 年 6 月 18 号" are acquired from the first line of the character string table. Then, in step 306, a cell with block locale "ja" and character string locale "zh_CN" in the category "date" of the tolerance table is referred to, acquiring tolerance "M." As, a result, the content update section 50 updates the content so that one can understand that the verification result is "Caution."

Further, in step 305, category "numeric" and locale "Western" for "500" are acquired from the third line of the character string, table. Then, in step 306, a cell with block locale "ja" and character string locale "Western" in the category "numeric" of the tolerance table is referred to, acquiring tolerance "H." As a result, the content update section 50 updates the content so that one can understand that the verification result is "OK."

Figure 9:
FIG. 9 is an illustration for explaining another example of verification performed by the first verification section of the embodiment of the present invention.

In the above example operation, verification as to whether a character string locale is appropriate is done for each of character strings extracted by the content analysis section 10, but it is not limited thereto. For example, verification may be done for adjacent multiple character strings extracted by the content analysis section 10. The following describes the operation in this case. FIG. 9(a) is an illustration showing an example of a content to be verified. The content analysis section 10 generates block information from this content. FIG. 9(b) is a table showing the block information generated by the content analysis section 10. In the character string table for this block information, the first line corresponds to "水," the second line corresponds to "08/08/2007," the third line corresponds to "10:51," and the fourth line corresponds to "午後." The category of the first line "水" is "DATE SUPPLEMENTAL INFORMATION" because it can be a day of the week, and the category of the fourth line "午後" is "TIME SUPPLEMENTAL INFORMATION." In this case, since the block locale is "ja," the verification result is likely to be "Warning" because the order of arrangement of "水" as the day of the week and "08/08/2007" as the date is not appropriate in Japanese.

Next, the operation of the second verification section 40 will be described. Here, it is assumed that the second verification section 40 operates on the following assumptions. Firstly, content locations corresponding to languages (e.g., language A and language B) to be compared are given in advance to the second verification section 40. These content locations may be given as URLs like "http://www.foo.com/en-us/info.html" for language A and "http://www.foo.com/ja-jp/info.html" for language B. Here, character strings indicating languages are included in the URL examples, but information from which one can understand the language is not necessarily included in the URLs, because the second verification section 40 does not estimate the languages from the URLs. Secondly, the number of blocks included in each content does not increase or decrease as long as the content is translated properly. In other words, a character string as a cue for division into blocks is not a translation target.

Under these assumptions, the second verification section 40 operates as follows. FIG. 10-1 and FIG. 10-2 are flowcharts showing an example operation of the second verification section 40 under these assumptions. In this example operation, it is assumed that the content of language A and the content of language B are to be compared and verified. First, as shown in FIG. 10-1, based on the URLs indicating the content of language A and the content of language B stored in the analysis result storage section 20, the second verification section 40 acquires the number of blocks included in each content (step 401). Here, for example, information indicating that the number of blocks included in the content of language A and the number of blocks included in the content of language B are both 60, or information indicating that the number of blocks included in the content of language A is 60 but the number of blocks included in the content of language B is 48, is acquired.

Next, the second verification section 40 creates a sequence of appearance counts for each block of language A and a sequence of appearance counts for each block of language B (step 402). Here, a sequence of appearance counts for one block consists of sequences in each of which the numbers of appearance of character strings belong to each category are listed in order of category ID and which are arranged in order of sentence ID. This sequence of appearance counts can be represented in a format like {[1,1,1,0, . . . ],[0,0,2,0, . . . ]}, for example. In this case, [1,1,1,0, . . . ] indicates that one character string with category ID "1," one character string with category ID "2," one character string with category ID "3," and no character string with category ID "4" appear in a sentence with sentence ID "1." [0,0,2,0, . . . ] indicates that no character string with category ID "1," no character string with category ID "2," two character strings with category ID "3," and no character string with category ID "4" appear in a sentence with sentence ID "2." Then, the second verification section 40 determines whether the numbers of blocks in the respective contents acquired in step 401 are the same (step 403).

As a result, if the numbers of blocks are the same, the second verification section 40 creates block ID correspondence information in which corresponding block IDs are associated (step 404). Here, the block ID correspondence information is information created by listing pairs of corresponding block IDs in the order of the block ID included in each pair. For example, if such information to indicate 60 blocks are included in both the content of language A and the content of language B is acquired in step 401, the block ID correspondence information can be created in a format like {[1,1],[2,2], . . . ,[60,60]}.

On the other hand, there is a case where the numbers of blocks do not match due to a missing part in the translation, an error in integration, or the like. Therefore, if it is determined that the numbers of blocks are different, the second verification section 40 performs processing for a missing block(s).

In other words, the second verification section 40 first identifies a missing block and creates block ID correspondence information (step 405). In this case, if such information to indicate, for example, that the number of blocks included in the content of language A is 60 and the number of blocks included in the content of language B is 48 is acquired in step 401, the block ID correspondence information can be created in a format like {[1,1],[2,2], . . . ,[60,48]}. FIG. 11(a) shows an outline of missing block identification processing for identifying which block is missing. In this missing block identification processing, the sequence of appearance counts for each block of language A is compared with the sequence of appearance counts for each block of language B to find a pair(s) of blocks for which the sequences of appearance counts do not match. As shown, for example, both the block with block ID "1" of language A and the block with block ID "1" of language B have the sequence of appearance counts {[1,1,1,0, . . . ],[0,0,2,0, . . . ]}, these blocks are determined to match. On the other hand, if the sequence of appearance counts for the block with block ID "3" of language B is {[1,0,2,0, . . . ],[0,1,2,0, . . . ]} but the sequence of appearance counts for the block with block ID "3" of language A does not match that of language B, the pair of blocks is changed and compared. As a result, the block with block ID "6" of language A and the block with block ID "3" of language B are both {[1,0,2,0, . . . ],[0,1,2,0, . . . ]}, and these blocks are determined to match. In this case, the block ID correspondence information can be created in a format like {[1,1],[2,2],[6,3],[7,4],[8,5]}.

Next, the second verification section 40 notifies the content update section 50 of information on the missing block (step 406). FIG. 11(b) is an illustration showing what kind of information the second verification section 40 notifies. In the case of a missing block(s), it cannot be recovered unlike a missing category to be described later. Therefore, the second verification section 40 notifies position information as shown, i.e., start position X and end position Y of missing blocks of language A and estimated inserting position Z in language B without trying to recover them.

After that, the second verification section 40 repeats verification for each pair with each block ID included in the block ID correspondence information created in step 404 or step 405 as to whether blocks identified by the block ID included in each pair are the same blocks. In other words, the second verification section 40 first acquires a pair of sequences of appearance counts corresponding to each pair with one block ID, i.e., the sequence of appearance counts for the block of language A and the sequence of appearance counts for the block of language B (step 407). Then, it is determined whether the sequence of appearance counts for language A matches the sequence of appearance counts for language B (step 408). As a result, if it is determined that the two sequences of appearance counts match, procedure shifts to associating processing for each category.

On the other hand, there is a case where the numbers of categories do not match due to garbled data or the like, for example. Therefore, if it is determined that the numbers of categories are different, the second verification section 40 performs processing for a missing category, In other words, the second verification section 40 tries to recover the category by all possible means, such as by using the locale estimate list for the block or the preceding and following characters (step 409). As an example, suppose that there is a character string " 水 " immediately after or with several characters after a character string "2008 年 11 月 25 日." Suppose further that the category and locale of the former character string are "date" and "ja" and the category of the latter character string is "none." In such a case, the two character strings are grouped, assuming that its category is "date" and its locale is "ja." As another example, suppose that there is a character string "24" immediately after or with several characters after a character string "11:." Suppose further that both the former character string and the latter character string are so determined that their category and locale are "numeric" and "Western." In such a case, the two character strings are grouped, assuming that its category is "time" and its locale is "Western."

After that, the second verification section 40 determines whether it has succeeded in recovering the category (step 410). In other words, the above-mentioned processing is performed to determine whether the sequence of appearance counts for language A matches the sequence of appearance counts for language B.

As a result, if it is determined that it has succeeded in recovering the category, i.e., if it is determined, as a result of the above-mentioned processing, that the two sequences of appearance counts will end up matching with each other, procedure shifts to associating processing for each category. On the other hand, if it is determined that it has failed in recovering the category, i.e., if it is determined, as a result of the above-mentioned processing, that the two sequences of appearance counts will not end up matching, with each other, information on missing data is notified to the content update section 50 (step 411).

Referring next to FIG. 10-2, the second verification section 40 performs the following processing for each category of the sequence of appearance counts. Namely, the second verification section 40 first acquires information on one category (step 421). Here, information on the category to be acquired may include the content of each character string as well as the number of character strings belonging to the category. The number of character strings can be acquired from the sequence of appearance counts held by the second verification section 40, but the content of each character string is acquired from the character string table stored in the analysis result storage section 20.

Next, the second verification section 40 determines the number of character strings belonging to the category (step 422). Here, if the number of character strings belonging to the category is "0," processing for this category is skipped. If the number of character strings belonging to the category is "1," character string difference calculation processing to be described later is performed (step 423). This character string difference calculation processing is for calculating a difference between a character string belonging to a category appearing in each block of language A and a character string belonging to the same category appearing in each block of language B, and the difference between the two character strings is returned as a return value.

Therefore, the second verification section 40 determines whether the difference between the two character strings falls within an acceptable range as an example of a preset threshold value (step 424). If it took some days from the creation of the content of language A until the creation of the content of language B, the creation date described in the content of language A may be different from the creation date described in the content of language B. In such a case, if only the same date is to be allowed, the user will have to focus attention on the date that is supposed to be correct by definition, and it will be bothersome. Therefore, it is here determined whether the difference falls within a certain acceptable range. Such an acceptable range can be provided for any category other than date, such as time, numeric, currency, position information, etc. Then, if the difference does not fall within the acceptable range, the second verification section 40 notifies the content update section 50 of information indicating that the character strings do not match (step 425). On the other hand, if the difference falls within the acceptable range, such information is not notified.

Further, if the number of character strings belonging to the category is "2" or more, a position at which each character string appears in the block (such as sentence ID) is considered so that the correspondence between the character string of language A and the character string of language B can be narrowed down. This is done on the assumption that one sentence of language A is seldom divided into two or more sentences in language B as a result of translation. Thus, the second verification section 40 brings a character string into correspondence with a sentence (step 415). Then, it is determined whether all the character strings match sentences in a one-to-one relationship, respectively (step 416).

As a result, if all the character strings match the sentences in the one-to-one relationship, processing proceeds to step 433. For example, suppose that character strings A1, A2, and A3 are extracted from a block of language A, the sentence IDs of sentences in which each character string appears are 1, 2, and 4, character strings B1, B2, and B3 are extracted from a corresponding block of language B, and the sentence IDs of sentences in which each character string appears are 1, 2, and 4. In this case, if it is assumed that each corresponding character string does not span two or more sentences, it is found that A1 and B1, A2 and B2, and A3 and B3 correspond to each other. In this case, all are regarded in step 416 as matching each other in the one-to-one relationship, and processing proceeds to step 433. On the other hand, if all the character strings are not in the one-to-one relationship with the sentences, processing starting at step 426 is performed. For example, when all do not match in the one-to-one relationship, such as a case where the sentence IDs of sentences in which the extracted character strings appear are 1, 2, and 2, the processing starting at step 426 is performed on the remaining part after removing the one-to-one matched part.

In other words, the second verification section 40 first focuses attention on one of multiple combinations determined depending on which character string extracted from the content of language B is associated with each of the character strings extracted from the content of language A (step 426). For example, suppose that character strings A1, A2, and A3 are extracted from the content of language A and character strings B1, B2, and B3 are extracted from the content of language B. In this case, there are six combinations, namely {[A1,B1],[A2,B2],[A3,B3]}, {[A1,B1],[A2,B3],[A3,B2]}, {[A1,B2],[A2,B1],[A3,B3]}, {[A1,B2],[A2,B3],[A3,B1]}, {[A1,B3],[A2,B1],[A3,B2]}, and {[A1,B3],[A2,B2],[A3,B1]}. In general, if there are n character strings, the number of combinations is n! (factorial n). Therefore, in step 426, attention is focused on one of these combinations.

Next, the second verification section 40 focuses attention on one pair of character strings included in the combination on which attention is focused (step 427). For example, if the combination is {[A1,B1],[A2,B2],[A3,B3]}, attention is focused on a pair [A1,B1]. Then, the second verification section 40 performs, on the pair on which attention is focused, character string difference calculation processing to be described later (step 428). As mentioned above, this character string difference calculation processing is for calculating a difference between a character string belonging to a category appearing in each block of language A and a character string belonging to the same category appearing in each block of language B, and the difference between the two character strings is returned as a return value. After that, the second verification section 40 determines whether there is any unprocessed pair in multiple pairs included in the combination on which attention is focused (step 429). As a result, if it is determined that there is an unprocessed pair, processing steps 427 and 428 are repeated.

On the other hand, if it is determined that there is no unprocessed pair, the second verification section 40 calculates, based on the difference returned in step 428, standard deviation as an example of the degree of variations when the combination currently focused is adopted (step 430). After that, the second verification section 40 determines whether there is any unprocessed combination in multiple possible combinations (step 431). As a result, if it is determined that there is an unprocessed combination, processing steps 426 to 430 are repeated. On the other hand, if it is determined that there is no unprocessed combination, a combination with the smallest standard deviation calculated in step 430 is selected as the optimum association between the character string of language A and the character string of language B (step 432).

For example, suppose that character string A1 is "2008/10/20," character string A2 is "2008/10/22," character string A3 is "2008/10/24," character string B1 is "2008/10/22," character string B2 is "2008/10/24," and character string B3 is "2008/10/26." In this case, if {[A1,B1],[A2,B2],[A3,B3]} is adopted as the combination, differences between respective pairs are 2008/10/22−2008/10/20=2, 2008/10/24−2008/10/22=2, and 2008/10/26−2008/10/24=2, thus averaging out to 2. Therefore, in step 430, $0(=\sqrt{((2-2)2+(2-2)2+(2-2)2)/3})$ is calculated as the standard deviation. If {[A1,B3],[A2,B1], [A3,B2]} is adopted as the combination, differences between respective pairs are 2008/10/26−2008/10/20=6, 2008/10/22−2008/10/22=0, and 2008/10/24−2008/10/24=0, thus averaging out to 2. Therefore, in step 430, $\sqrt{8}(=\sqrt{(6-2)2+(0-2)2+(0-2)2)/3})$ is calculated as the standard deviation. Even if any other combination is adopted, since the standard deviation does not become less than zero, a combination having a standard deviation of zero is selected.

Next, the second verification section 40 focuses attention on one pair of character strings included in the selected combination (step 433). For example, if the combination is {[A1, B1],[A2,B2],[A3,B3]}, attention is focused on a pair [A1, B1]. Then, the second verification section 40 determines whether a difference between the two character strings included in the pair on which attention is focused falls within a preset acceptable range (step 434). If it took some days from the creation of the content of language A until the creation of the content of language B, the creation date described in the content of language A may be different from the creation date described in the content of language B. In such a case, if only the same date is to be allowed, the user will have to focus attention on the date that is supposed to be correct by definition, and it will be bothersome. Therefore, it is here determined whether the difference falls within a certain acceptable range. Such an acceptable range can be provided for any category other than date, such as time, numeric, currency, position information, etc. Then, if the difference does not fall within the acceptable range, the second verification section 40 notifies the content update section 50 of information indicating that the character strings do not match (step 435). On the other hand, if the difference falls within the acceptable range, such information is not notified. After that, the second verification section 40 determines whether there is any unprocessed pair in multiple pairs included in the selected combination (step 436). As a result, if it is determined that there is an unprocessed pair, processing steps 433 to 435 are repeated.

On the other hand, if it is determined that there is no unprocessed pair, the second verification section 40 determines whether there is any other unprocessed category (step 437). As a result, if it is determined that there is an unprocessed category, processing steps 421 to 436 are repeated. On the other hand, if it is determined that there is no unprocessed category, it is then determined whether there is any pair with unprocessed block ID (step 438). As a result, if it is determined that there is a pair with unprocessed block ID, processing steps 407 to 437 are repeated. On the other hand, if there is no pair with unprocessed block ID, processing ends.

Figure 12:
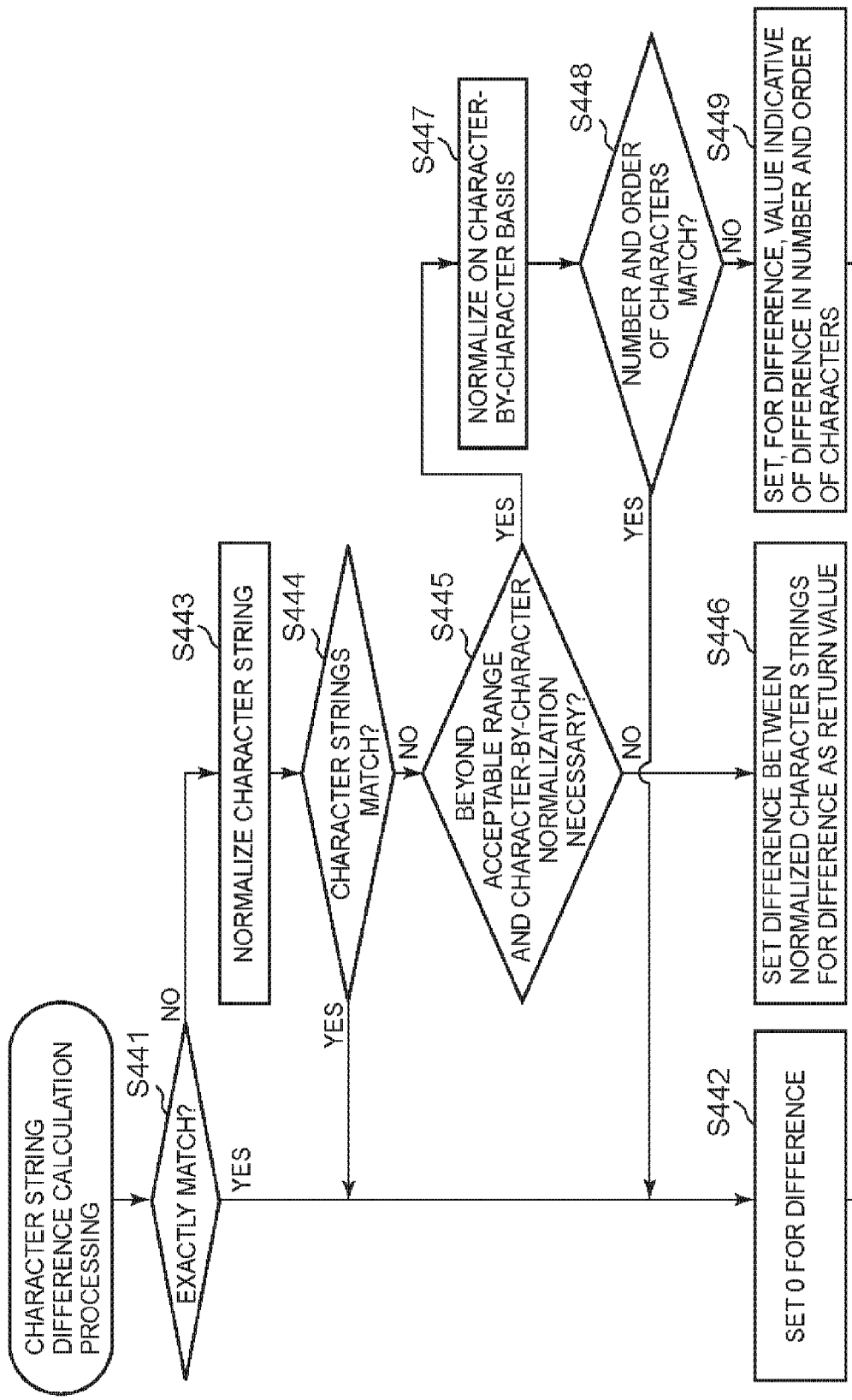
FIG. 12 is a flowchart showing example operations of character string difference calculation processing performed by the second verification section of the embodiment of the present invention.

The following describes the character string difference calculation processing in step 423 and step 428 of FIG. 10-2. FIG. 12 is a flowchart showing an example of a flow of the character string difference calculation processing. First, the second verification section 40 determines whether two character strings between which a difference is to be calculated exactly match (step 441). As a result, if it is determined that the two character strings exactly match, the second verification section 40 sets "0" for the difference as a return value (step 442). On the other hand, if it is determined that the two character strings do not exactly match, the second verification section 40 normalizes the two character strings (step 443). Here, normalization is to convert a character string to a specific description format in order to suppress a fluctuation of description of the character string. For example, if the specific description format for date is "YYYY-MM-DD" (where four digits "YYYY" represent Year, two digits "MM" represent Month, and two digits "DD" represent Day), "08/08/2007" is normalized as "2007-08-08," "09/08/2007" is normalized as "2007-08-09" or "2007-09-08," "17/10/2007" is normalized as "2007-10-17," respectively. At this time, block locale can be referenced prevent the number of candidates after normalization from being two or more. Then, the second verification section 40 determines whether the character strings after normalization (normalized character strings) match (step 444).

As a result, if it is determined that the normalized character strings match, the second verification section 40 sets "0" for the difference as a return value (step 442). On the other hand, if it is determined that the normalized character strings do not match, it is then determined whether a difference between the two normalized character strings is beyond the acceptable range and normalization should be done on a character-by-character basis (step 445). Here, as an example of the case where it is determined that the normalized character strings do not match, there is a case where the two character strings are "1.02 quadrillion" shown in FIG. 5 and "1.020 兆" shown in FIG. 6, for example. Here, since "quadrillion" means a thousand trillion, if the corresponding character string in the Japanese content of FIG. 6 is described as "1,020 兆" this matches "1.02 quadrillion." However, if such a language to use a comma (".") for the thousands separator is specified, this kind of error occurs. In this case, "1.02 quadrillion" is normalized as "1.02×10$^{15}$," whereas "1.020 兆" is normalized as "1.020×10$^{12}$." Thus, the normalized character strings do not match. Since these two character strings are determined not to fall within the acceptable range in step 424 or 434 of FIG. 10-2, the verification result is "Warning." for example.

Further, the determination as to whether the difference between the two normalized character strings is beyond the acceptable range and normalization should be done on a character-by-character basis is made by referring to a table in which the acceptable range and the transformation configuration are defined for each category. Here, the transformation configuration is a configuration for giving an instruction as to whether to do normalization on a character-by-character basis. If the transformation configuration is "Yes," it means that normalization should be done on a character-by-character basis, while if the transformation configuration is "No," it means that normalization should not be done on a character-by-character basis. For example, suppose that the character string difference calculation processing for date is performed when the table is so defined that the acceptable range for category "date" is "within a week from the date" and the transformation configuration is "No." In this case, even if the date of one normalized character string does not fall within a week from the date of the other normalized character string, since the transformation configuration is "No," normalization for each character string is not done. On the other hand, suppose that the character string difference calculation processing for numeric is performed when the table is so defined that the acceptable range for category "numeric" is "±100," and the transformation configuration is "Yes." In this case, if the difference between two normalized character strings exceeds 100, since the transformation configuration is "Yes," normalization for each character string is done.

As a result of determination in step 445, if the difference between two normalized character strings falls within the acceptable range or it is determined that character-by-character normalization should not be done, the difference between the two normalized character strings is set for the difference as a return value (step 446). On the other hand, if the difference between the two normalized character strings is beyond the acceptable range and it is determined that character-by-character normalization should be done, at least either of the two normalized character strings is further normalized on a character-by-character basis (step 447). Here, as character-by-character normalization, replacement of a Chinese numeral with an Arabic numeral is considered, for example. Then, it is determined whether the numbers and orders of characters (i.e., the frequencies and orders of appearance of characters) in the character strings normalized on a character-by-character basis are the same (step 448). As mentioned above, if it is the case where a Chinese numeral is replaced with an Arabic numeral, attention is focused on respective Arabic numerals to determine whether the numbers and orders are the same. As a result, if it is determined that the numbers and orders of characters are the same, the second verification section 40 sets "0" for the difference as a return value (step 442). On the other hand, if it is determined that the numbers and orders of characters are different, the second verification section 40 sets, for the difference as a return value, a numeral indicative of the difference in the number and order of characters (step 449).

The following describes this character string difference calculation processing using specific examples. This character string difference calculation processing is to associate one character string with another character string to calculate a difference therebetween. However, for convenience sake, the following describes a case where multiple character strings are associated with one character string to collectively calculate differences for respective combinations. It is also assumed that the examples hold a table defined such that the acceptable range is "within a week from the date" and the transformation configuration is "No" for category "date," and the acceptable range is "±100" and the transformation configuration is "Yes" for category "numeric."

It is first considered a case, as an example, in which differences between a character string "午後" 19 年 10 月 13 日" of language A and character strings "08/08/2007," "09/08/2007," and "17/10/2007" of language B are calculated. In this case, even if any of the character strings of language B is combined with the character string "午後" 19 年 10 月 13 日" there is no exact match in step 441. Therefore, the character strings are normalized in step 443. In other words, the character string "午後" 19 年 10 月 13 日" of language A is converted to "2007-10-13," and the character strings "08/08/2007," "09/08/2007," and "17/10/2007" of language B are converted to "2007-08-08," "2007-08-09,""2007-10-17," respectively.

However, even if any of the normalized character strings of language B is combined with the normalized character string "2007-10-13" of language A, there is no match in step 444. This example is to calculate differences in date and the transformation configuration is "No," so that it is determined that character-by-character normalization is not done in step 445 regardless of the difference value. Therefore, a difference in combination between the character string of language A and each character string of language B is calculated. In other words, in step 446, "−66," "−65," and "4" are set as differences between "午後" 19 年 10 月 13 日" and "08/08/2007," "09/08/2007," "17/10/2007," respectively. In this example, if "within a week from the date" is also defined as the acceptable range for the final display, it is determined that the character string "午後" 19 年 10 月 13 日" of language A is consistent with the character string "17/10/2007" of language B.

Secondly, it is considered a case, as another example, in which differences between a character string 参兆弐万 of language A and character strings "3020000" and "400000000" of language B are calculated. In this case, even if any of the character strings of language B is combined with the character string "参兆弐万" there is no exact match in step 441. Therefore, the character string is normalized in step 443. In other words, the character string "参兆弐万" of language A is converted to "3000000020000."

However, even if any of the normalized character strings of language B is combined with the normalized character string "3000000020000" of language A, there is no match in step 444. This example is to calculate differences in numeric, the acceptable range is "±100" and the transformation configuration is "Yes," so that it is determined that character-by-character normalization is done in step 445, because the differences exceed 100. Therefore, the character string is normalized, in step 447 on a character-by-character basis. In other words, in the character string 参兆弐万 of language A, character-by-character normalization can be done like "参" to "3," 兆 to "1000000000000, "弐" "2," and 万 to "10000," and these are connected to generate a character string "31000000000000210000."

The sequence of characters in this normalized character string is "3, 1, 0, 2, 1, 0," whereas the sequences of characters in the character strings "3020000" and "400000000" of language B are "3, 0, 2, 0" and "4, 0," respectively. Thus, there is no match in step 448. Therefore, in step 449, numerals indicative of differences in the number and order of characters are set for the differences. In this case, for example, a difference in the number and order of characters can be represented in such a manner to associate matched portions in the two character strings and count the number of other characters that exist in one character string but not in the other character string. In other words, the difference in the order of characters between "3, 1, 0, 2, 1, 0" and "3, 0, 2, 0" can be represented as "2," because the two "1s" appearing in the former are not present in the latter. The difference in the sequence of characters between "3, 1, 0, 2, 1, 0" and "4, 0" can be represented as "6," because "3", "1", "0", "2", "1" appearing in the former is not present in the latter and "4" appearing in the latter is not present in the former.

In this example, it is assumed that 参兆弐万 in the content of language A is written as "3020000" in the content of language B based on the fact that 兆 means $10^6$ in Chinese though it means $10^{12}$ in Japanese, but even such an error can be found.

Then, in the embodiment, the content update section 50 updates the content stored in the content storage section 5 based on these verification results so that the content can be displayed on the screen of the verification support apparatus 1 in an easy-to-understand manner. FIG. 13 is an illustration showing an example of a content displayed as a result of such processing. Here, "2008 年" 6 月" 18 号" determined to be "Caution" in the first verification section 30 and "1.020 兆" " determined to be "Warning" in the second verification section 40 are highlighted by the solid boxes. In FIG. 13, "Caution" and "Warning" are surrounded by the boxes having the same line thickness, but different styles can be applied to discriminate error levels. Further, in FIG. 13, nothing is displayed for even character strings extracted as region, culture-specific data as long as the verification results thereof are "OK." However, they may be displayed with inconspicuous markings to indicate that they are extracted as region/culture-specific data.

The embodiment has been described above. Thus, in the embodiment, in order to support verification of region/culture-specific data, region/culture-specific data are automatically detected from data (mainly text data) on the screen the person in charge of verification is browsing and so displayed that the person can easily view them. In addition, information as to whether the detected region/culture-specific data are right or wrong and additional information are also displayed. Specifically, efficient and accurate implementation of globalization testing is supported in combination of functional sections mentioned above. Namely, the content analysis section 10 and the content update section 50 enable the person in charge of verification to visually identify data worthy of note and determine the results in connection with the problems (1), (2), and (4) as mentioned at the outset. The first verification section 30 and the content update section 50 enable checking of the verification result of data displayed in a typical pattern in connection with the problem (3) as mentioned at the outset. Further, the analysis result storage section 20, the second verification section 40, and the content update section 50 enable the person to find a missing portion or compare the contents in connection with the problem (5) as mentioned at the outset.

As use cases of the embodiment, the following cases can be considered. A first case is that the apparatus performs processing on a content output via an application to make it easy to view region/culture-specific data worthy of note in order to test the data. This is a case for a single content. A second case is that a person in charge of verifying an application for displaying the same content in multiple languages does verification while comparing a base language with the other languages. This is a case where region/culture-specific data mainly handled by the application are automatically acquired from the system to generate contents. A third case is that, after a content to be translated in multiple languages such as a press release or announcement letter is created, the person in charge of verification verifies whether translation-independent data such as date, numeric, money amount, etc. are consistent across the contents of respective languages. This is a case where contents mostly created manually are verified.

Figure 14:
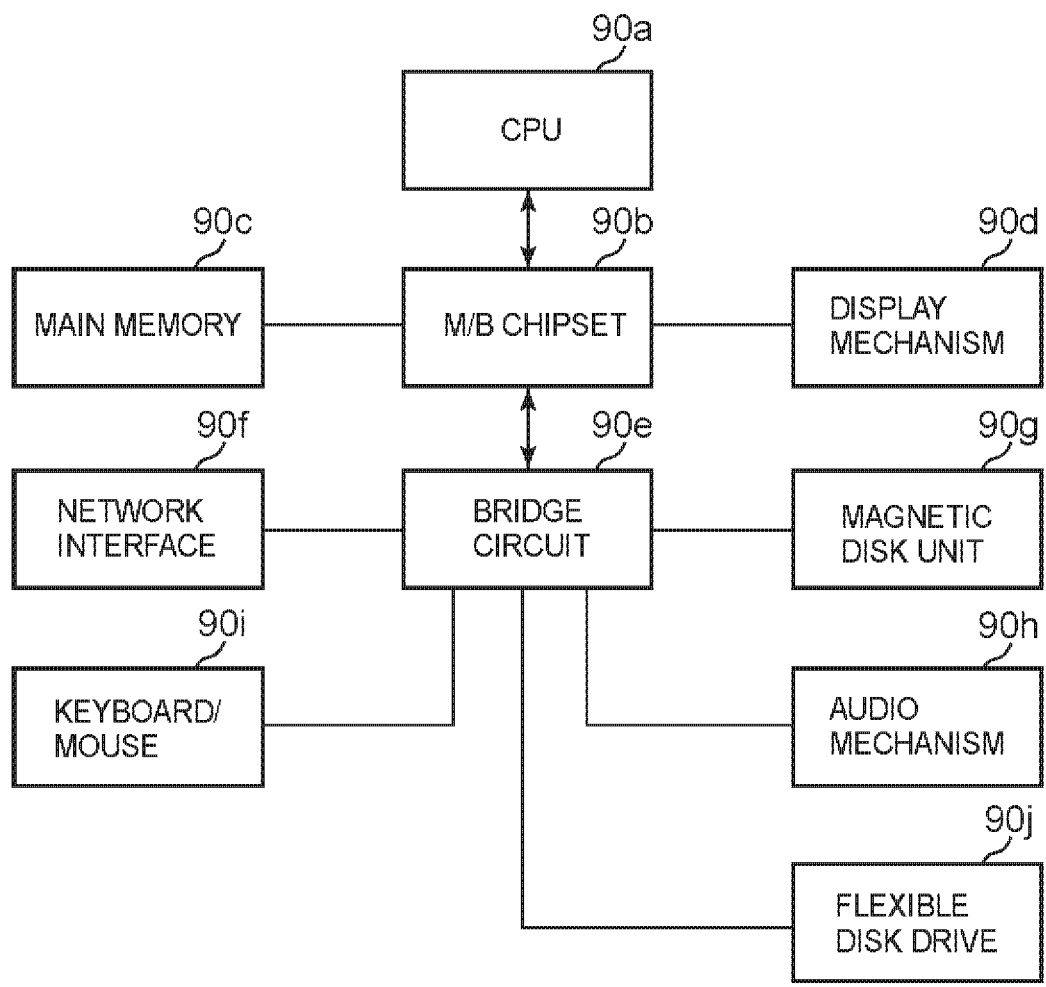
FIG. 14 is a block diagram showing a hardware configuration of a computer to which the embodiment of the present invention is applicable.

Finally, a configuration of computer hardware suitable for applying the embodiment will be described. FIG. 14 is a block diagram showing an example of such a computer hardware configuration. As shown, the computer includes a CPU (Central Processing Unit) 90a as computing means, a main memory 90c connected to the CPU 90a through an M/B (motherboard) chipset 90b, and a display mechanism 90d connected to the CPU 90a through the M/B chipset 90b. The M/B chipset 90b is connected with a network interface 90f, a magnetic disk unit (HDD) 90g, an audio mechanism 90h, keyboard/mouse 90i, and a flexible disk drive 90j through a bridge circuit 90e.

In FIG. 14, each component is connected through a bus. For example, the CPU 90a and the M/B chipset 90b, and the M/B chipset 90b and the main memory 90c are connected through a CPU bus. The M/B chipset 90b and the display mechanism 90d may be connected through an AGP (Accelerated Graphics Port). However, when the display mechanism 90d includes a PCI Express video card, the M/B chipset 90b and this video card are connected through a PCI Express (PCIe) bus. When being connected through the bridge circuit 90e, PCI Express can be used, for example, for the network interface 90f. For the magnetic disk unit 90g, serial ATA (AT Attachment), parallel transfer ATA, or PCI (Peripheral Components Interconnect) can be used. For the keyboard/mouse 90i and the flexible disk drive 90j, USB (Universal Serial Bus) can be used.

Here, the present invention can be implemented by hardware or software only. Further, the present invention can be implemented as a computer, a data processing system, or a computer program. This computer program can be provided in a form stored on a computer-readable medium. Here, the medium can be considered to be of electronic, magnetic, optical, electromagnetic, or infrared type, a semiconductor system (device or equipment), or a propagation medium. The computer-readable media include a semiconductor device, a solid-state storage device, a magnetic tape, a removable computer diskette, a random access memory (RAM), s read-only memory (ROM), a rigid magnetic disk, and an optical disk. Examples of optical disks at present include compact disk read-only memory (CD-ROM), compact disk-read/write (CD-R/W), and DVD.

While the present invention has been described with reference to the embodiment, the technical scope of the present invention is not limited to the aforementioned embodiment. It will be understood by those skilled in the art that various changes can be made and modifications can be adopted without departing from the spirit and scope of the invention.

What is claimed is:

1. A method of supporting verification of software internationalization, the method comprising:
performing, by a processor, operations of:
acquiring first text data output by an operating software in a first language environment;
extracting, from the first text data, multiple character strings of a predetermined kind described in a language-dependent format;
acquiring second text data output by the operating software in a second language environment;
extracting, from the second text data, multiple character strings of the predetermined kind;
associating each of the multiple character strings extracted from the first text data with each of the multiple character strings extracted from the second text data based on a difference between each character string extracted from the first text data and each character string extracted from the second text data; and
comparing a first normalized character string, obtained by normalizing, in a specific description format, a first character string of the multiple character strings extracted from the first text data, with a second normalized character string, obtained by normalizing, in the specific description format, a second character string selected as being associated with the first character string from among the multiple character strings extracted from the second text data to determine whether a content represented by the first character string is consistent with a content represented by the second character string.

2. The method of claim 1 wherein the associating each of the multiple character strings extracted from the first text data with each of the multiple character strings extracted from the second text data based on the difference between each character string extracted from the first text data and each character string extracted from the second text data comprises:

associating each of the multiple character strings extracted from the first text data with each of the multiple character strings extracted from the second text data to form multiple pairs of character strings in order to determine whether to associate the first character string with the second character string based on a degree of variations among the multiple pairs in terms of the difference in each pair of character strings.

3. The method of claim 1 wherein the comparing the first normalized character string, obtained by normalizing, in a specific description format, the first character string of the multiple character strings extracted from the first text data, with the second normalized character string, obtained by normalizing, in the specific description format, the second character string selected as being associated with the first character string from among the multiple character strings extracted from the second text data to determine whether a content represented by the first character string is consistent with the content represented by the second character string comprises:
determining that the content represented by the first character string is consistent with the content represented by the second character string when a difference between the first normalized character string and the second normalized character string falls within a predetermined threshold value.

4. The method of claim 1 wherein the comparing the first normalized character string, obtained by normalizing, in a specific description format, the first character string of the multiple character strings extracted from the first text data, with the second normalized character string, obtained by normalizing, in the specific description format, the second character string selected as being associated with the first character string from among the multiple character strings extracted from the second text data to determine whether a content represented by the first character string is consistent with the content represented by the second character string comprises:
comparing, in terms of an order and a frequency of appearance of characters, two character strings obtained by converting at least either of the first normalized character string and the second normalized character string according to a specific rule on a character-by-character basis to determine whether the content represented by the first character string is consistent with the content represented by the second character string.

5. The method of claim 1 further comprising:
outputting a result of the determining whether the content represented by the first character string is consistent with the content represented by the second character string in association with at least either of the first character string in the first text data and the second character string in the second text data.

6. The method of claim 1 further comprising:
determining whether the language of the first text data and the second text data is consistent with each language of the multiple character strings extracted from the first text data and the second text data.

7. A method for supporting verification of software internationalization, the method comprising:
performing, by a processor, operations of:
extracting multiple text blocks from text data output by an operating software;
extracting from each of the multiple text blocks multiple character strings of a predetermined kind described in a language-dependent format;
determining whether to associate a first text block of the multiple text blocks extracted from first text data output by the operating software in a first language environment with a second text block of the multiple text blocks extracted from second text data output by the operating software in a second language environment, based on the multiple character strings extracted from the first text block and the multiple character strings extracted from the second text block;
when the first text block and the second text block are determined to be associated, determining, using a difference between a first character string and a second character string, whether to associate the first character string of the multiple character strings extracted from the first text block with the second character string of the multiple character strings extracted from the second text block;
when the first character string and the second character string are determined to be associated, comparing a first normalized character string obtained by normalizing the first character string in a specific description format with a second normalized character string obtained by normalizing the second character string in the specific description format to determine whether a content represented by the first character string is consistent with a content represented by the second character string; and
outputting a result of the determining whether the content represented by the first character string is consistent with the content represented by the second character string in association with at least either of the first character string in the first text data and the second character string in the second text data.

8. A computer program product for supporting verification of software internationalization, said computer program product comprising:
computer readable storage device;
performing, by a processor, operations of:
first program instructions to acquire first text data output by an operating software in a first language environment;
second program instructions to extract, from the first text data, multiple character strings of a predetermined kind described in a language-dependent format;
third program instructions to extract, from the second text data, multiple character strings of the predetermined kind;
fourth program instructions to associate each of the multiple character strings extracted from the first text data with each of the multiple character strings extracted from the second text data based on a difference between each character string extracted from the first text data and each character string extracted from the second text data; and
fifth program instructions to compare a first normalized character string, obtained by normalizing, in a specific description format, a first character string of the multiple character strings extracted from the first text data, with a second normalized character string, obtained by normalizing, in the specific description format, a second character string selected as being associated with the first character string from among the multiple character strings extracted from the second text data to determine whether a content represented by the first character string is consistent with a content represented by the second character string, wherein said first, second, third, fourth, and fifth program instructions are stored on the computer readable storage medium.

* * * * *